Figure 1:
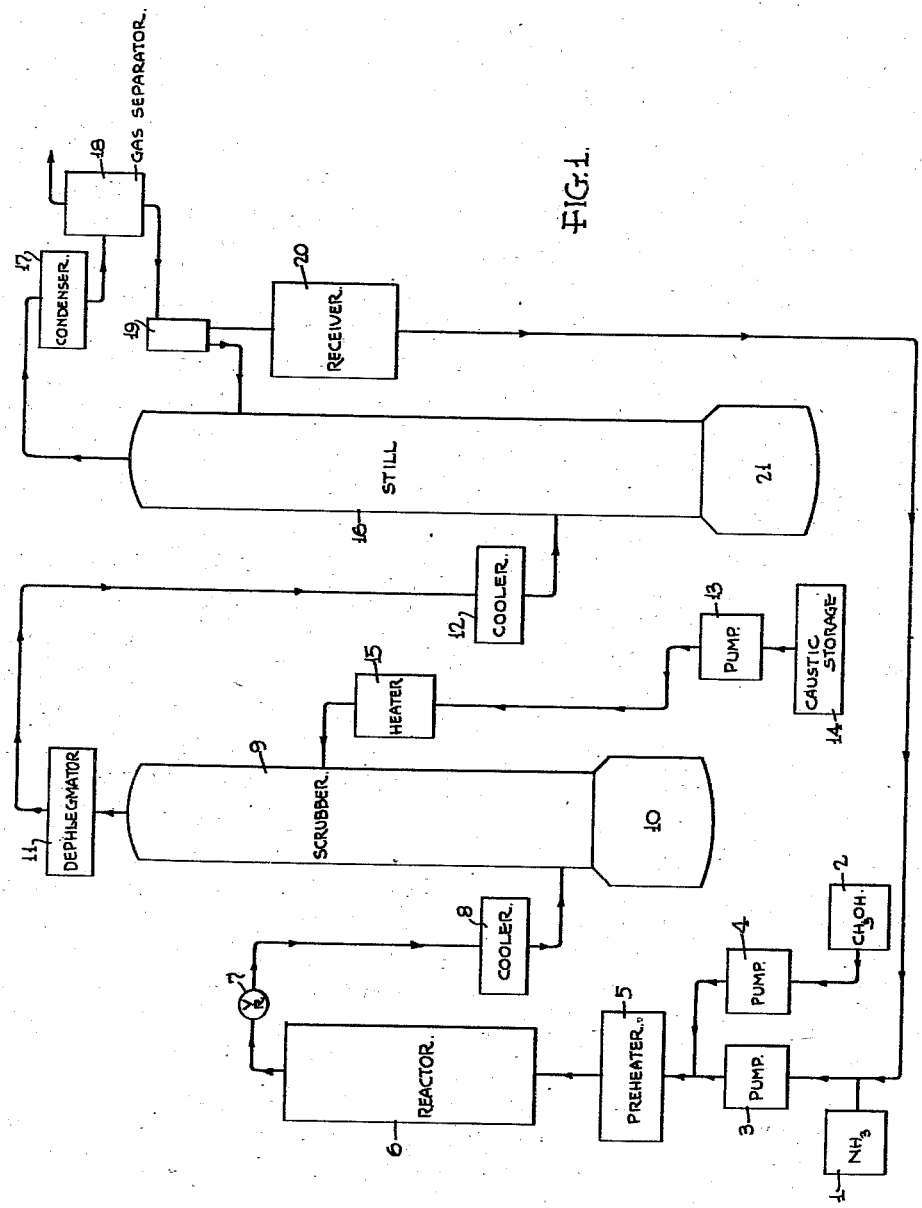

June 5, 1945.    J. F. OLIN    2,377,511
PURIFICATION OF AMINE REACTION MIXTURES
Filed Sept. 2, 1942    2 Sheets-Sheet 2

INVENTOR
John F. Olin.
BY *Maurice A. Crews*
ATTORNEY

Patented June 5, 1945

2,377,511

UNITED STATES PATENT OFFICE 2,377,511

PURIFICATION OF AMINE REACTION MIXTURES

John F. Olin, Grosse Ile, Mich., assignor to Sharples Chemicals Inc., Philadelphia, Pa., a corporation of Delaware Application September 2, 1942, Serial No. 457,053

10 Claims. (Cl. 260—585)

The present invention pertains to the purification of crude reaction mixtures resulting from amination of aliphatic alcohols or ethers. Amination reactions of this general type are well known in the art, and are ordinarily performed in the vapor phase, with the aid of dehydration catalysts or hydrogenation catalysts. Either alcohols or ethers may be used as the source of the alkyl radical of the desired amine, as taught by Sabatier, Smolenski and others.

While the selective production of mono-, di-, and tri-alkyl amines may, to a large extent, be controlled by appropriate control of the proportions of reactants employed, it is inevitable that, in a process of this kind, a mixture of the three amines will be obtained in use of ammonia as the aminating agent, or a mixture of di- and tri-alkyl amines obtained in cases in which a mono-aliphatic amine is used as the aminating agent. In the majority of cases of use of these amines, the user wishes to employ one of the three amines resulting from the reaction to the virtual exclusion of the other two. It is also necessary that the amine or mixture of amines obtained from the reaction be separated from other contaminating impurities, such as nitriles, carbon dioxide, alcohols, ethers, ammonia, aldehydes, etc. The removal of certain of these impurities presents a problem, not only because of the fact that the impurities are undesirable in the finished products, but also because of the fact that the presence of the impurities in the reaction mixture renders the problem of separation of the amines from each other more difficult.

The problem of separating the three amines from each other and from other impurities such as those discussed above is more acute in the treatment of mixtures resulting from amination of methanol or methyl ether with ammonia than in treatment of reaction mixtures resulting from amination of higher alcohols or ethers, but the two problems have some analogy, and the present invention provides a solution which is applicable both to the methyl amine reaction mixtures and the higher amine reaction mixtures. For the sake of simplicity of discussion, we shall consider first the application of the present invention to mixtures resulting from amination of methanol or methyl ether by ammonia, and we shall later discuss the application of an analogous technique to separation of mixtures containing aliphatic amines of higher carbon content.

As pointed out above, reaction mixtures resulting from amination of methanol by ammonia contain mono-, di-, and tri-methyl amine, the proportions of these constituents relatively to each other depending on the proportion of ammonia to methanol or methyl ether in the reaction mixture, the time and temperature of the reaction and other reaction conditions, which are well understood by those skilled in this art. In addition to these three amines, which must ordinarily be separated from each other and from unreacted ammonia with a reasonable degree of efficiency, the reaction mixture ordinarily contains formaldehyde, carbon dioxide, methanol, methyl ether and other impurities. The problem of effecting the desired degree of separation of the respective amines from these impurities and from each other has been one which has caused unusual difficulty to chemists working in this field.

The present invention rests upon the discovery that, when reaction mixtures such as those discussed above are thoroughly mixed with an aqueous solution of an inorganic base, and the amines contained in the reaction mixture are thereafter removed by distillation from the resulting mixture, the problem of separating the respective amines from each other and from impurities is greatly facilitated. While I do not wish to be limited by any theoretical reasoning concerning results attained by the practice of the invention, it is believed that the treatment of the crude reaction mixture by an inorganic base results in reactions by which certain constituents of the amine-containing reaction mixture undergo a chemical change which results in their conversion into non-volatile, water-soluble, salts, by reactions with the base, and that the removal of these constituents in the form of an aqueous solution permits the remaining constituents of the reaction mixture to be separated from each other with greater facility. More particularly, it is believed that the carbon dioxide is converted to a carbonic acid salt by treatment with the aqueous basic solution, and that the formaldehyde is converted to a formic acid salt, both of these products being retained in the aqueous phase upon subsequent removal of the other constituents of the reaction mixture from the aqueous phase by distillation. By preliminarily removing these two constituents (and possibly also other constituents undergoing somewhat analogous reactions), we are able to obtain an economical separation of the respective amines from impurities and from each other with much less difficulty than is involved in prior art processes.

The process of the present invention may be accomplished either by batch or continuous operation. If it is accomplished by batch operation, the crude amine-containing reaction mixture may be mixed with an aqueous basic solution for a sufficient length of time to effect solution in the aqueous phase of reaction products of the base upon constituents of the reaction mixture. This may be accomplished at atmospheric or super-atmospheric pressure, but I prefer to operate at super-atmospheric pressure, since, by so operating, the reaction mixture may be maintained in liquid phase at elevated temperatures, and the use of elevated temperatures facilitates the rapid completion of the reactions by which impurities which react with the base are converted into non-volatile water-soluble salts.

After the desired contact between the crude reaction mixture and the basic solution is accomplished, the constituents of the reaction mixture which are not converted into non-volatile compounds by treatment with the base are removed from the aqueous phase by distillation. This may be accomplished by fractional distillation from the aqueous phase; i. e., by distilling and separately condensing and collecting the separate constituents of the reaction mixture, or it may be accomplished by distilling all of the constituents of the mixture resulting from the treatment with the basic solution which are more volatile than the basic solution itself, and thereafter subjecting the mixture of organic constituents so obtained in the distillate to a separate fractionation by distillation. Regardless of which of these two procedures is adopted, the methyl alcohol may be retained with the aqueous phase while other organic constituents are passed overhead, or it may be passed overhead and collected with the other organic constituents or as a separate fraction.

The present invention may be very effectively practiced in a continuous manner by mixing the crude amine reaction mixture with the aqueous basic solution during continuous flow of the crude reaction mixture, and subjecting the resulting mixture formed by addition of the base to distillation in the same apparatus in which the mixing operation takes place, or in separate apparatus. If such an operation is performed, it may involve lation of diethylamine of good quality. However, a crude containing these impurities may be roughly fractionated taking a diethylamine cut boiling between 40 and 60° C., containing both carbamates and acetonitrile and this partially purified product may be subjected to the action of the alkaline solution, either as a batch operation or a continuous operation. Moreover, even when carbamates are not present it is impossible to obtain by straightforward distillation, when acetonitrile is present, a perfectly pure diethylamine, since the latter forms a constant boiling mixture with acetonitrile containing 93% of diethylamine and distilling at 52 to 53° C. By the process of our invention the troublesome acetonitrile may be chemically removed making possible the production of diethylamine of excellent purity.

Figure 2:
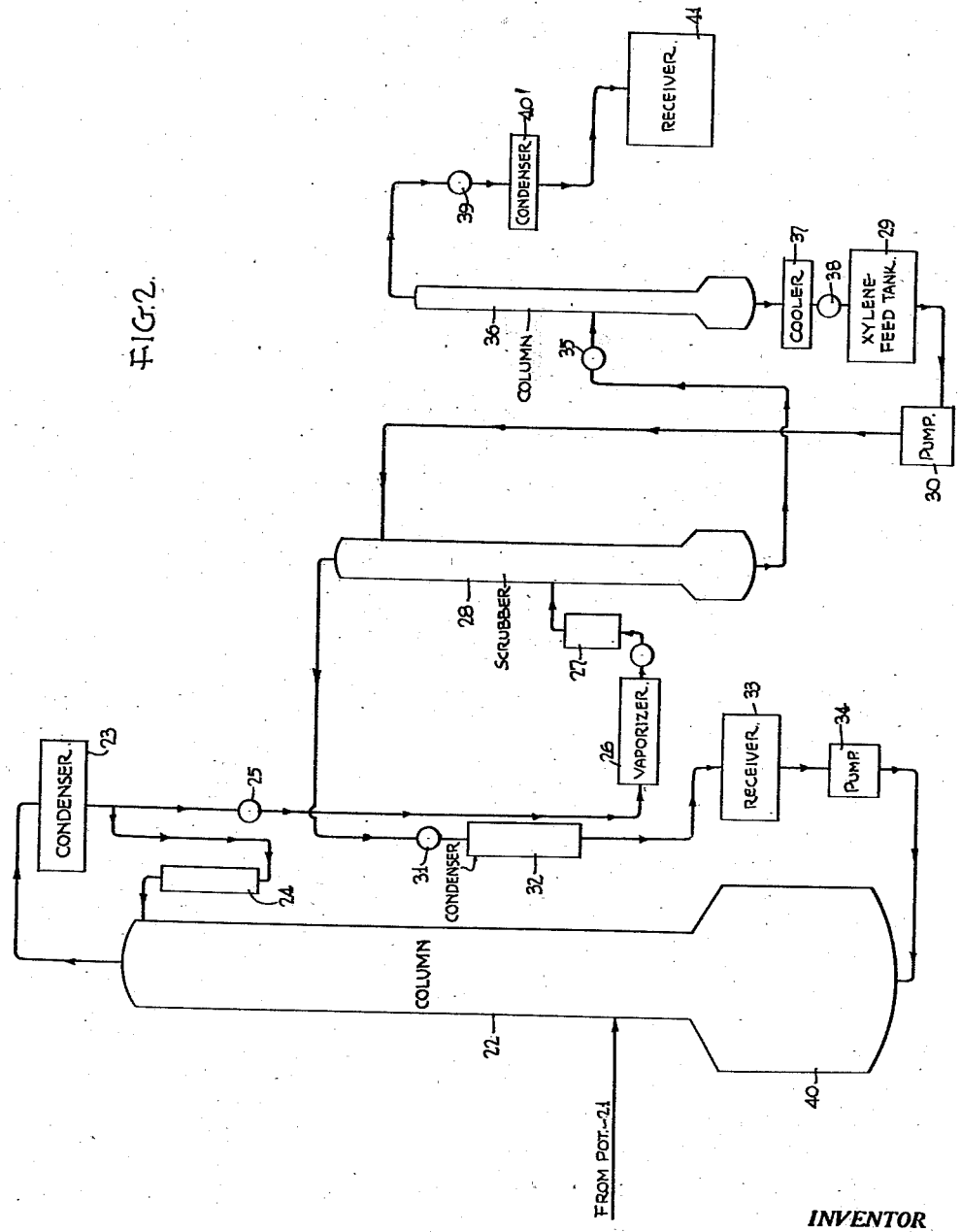

In the attached drawings,

Figure 1 is a flow sheet illustrating one form of the invention by which it may be applied in practice of a continuous process, and Figure 2 is a flow sheet illustrating the preferred method of separating mono-, di-, and trimethyl amines from each other, after they are separated from impurities by the process of Fig. 1.

Referring to Figure 1, ammonia may be withdrawn from container 1 by pump 3 and passed into confluence with a proportioned stream of methanol or methyl ether withdrawn from container 2 by pump 4. The stream resulting from mixing of the methanol (or methyl ether) with ammonia is then passed through preheater 5 and thence through a reactor 6 which contains a suitable catalyst, such as a known dehydrating or hydrogenation catalyst. The reaction mixture relation of methanol with the aqueous phase collected in this still pot.

The more volatile reaction products, consisting of the methyl amines, unreacted methanol, ammonia, methyl ether and fixed gases, relatively free from carbon dioxide and formaldehyde or complexes of these compounds, pass through cooler 12 into an intermediate point of still 16. The more high boiling constituents of the mixture passed to still 16, including mono-methyl, di-methyl amine, methanol (if present in the fraction passed to the still 16), and sometimes tri-methyl amine (depending upon the ratio of alkylating agent to aminating agent in the reaction mixture), are collected in the pot 21 of still 16, and may thereafter be separated from each other, for example by distillation. The overhead fraction from the still 16 is passed through a condenser 17 to a gas separator 18, from which fixed gases are vented from the system. The liquid fraction from the gas separator 18 is passed to a weir box 19, from which a suitable portion is returned as reflux to still 16, and the remainder collected in receiver 20. This material in receiver 20 will contain ammonia and methyl ether, together with some tri-methyl amine, and may be recycled through the pump 3, preheater 5 and reactor 6, in order that it may be combined with a further quantity of methanol (or methyl ether) and ammonia in the continued practice of the amination reaction and subsequent fractionation.

Best results have been attained in practice of the invention in use of sodium hydroxide as the base with which the crude amine-containing reaction mixture is treated in cases in which the sodium hydroxide is between 15 and 30% in concentration, but concentrations falling between 5% and 50%, and even within wider limits may be used, depending upon the particular temperature employed and time of contact between the caustic soda solution and the amine-containing reaction mixture.

While the temperatures and pressure employed in practice of the process may vary within wide limits, and are controlled solely by the factors necessary to attain the chemical treatment and fractionation discussed above, best results in practice of the invention in accordance with the continuous procedure described above may be attained by maintaining the temperature between 100 and 125° C. and the pressure between 150 and 400 pounds per square inch (gauge) during the treatment in column 9.

Figure 2 illustrates a preferred procedure in separating the mono-, di-, and tri-methyl amines obtained in the pot 21 of still 16 from each other and from any ammonia which they may contain. As illustrated in this figure, the mixture from the pot 21 may be passed to a column 22 provided with a pot 40 to effect this separation. A sufficient amount of ammonia is also passed to this column to carry all of the tri-methyl amine contained in this part of the reaction mixture overhead from the column 22 in the form of an azeotropic mixture with the ammonia. The mixture passing overhead from column 22 is passed to a condenser 23, from which condensate is returned through the reflux meter 24 to the top of the column 22. The uncondensed mixture of tri-methyl amine and ammonia is passed through valve 25, vaporizer 26 and meter 27 to a central portion of a scrubbing column 28. A solvent is introduced toward the top of the column 28, this solvent being of a type capable of selectively extracting the tri-methyl amine from the mixture passing to that column from the column 22. An aromatic hydrocarbon solvent is preferred for this purpose, and to this end, the preferred practice of the invention involves passage of xylene or equivalent solvent from tank 29 through pump 30 into the top of the column, from which the xylene flows in counter-current relationship to the ascending vapor phase mixture of ammonia and tri-methyl amine passed into the central portion of the column. The xylene extracts the major portion of the tri-methyl amine from its mixture with ammonia during descent of the xylene through the column, the ammonia passing overhead and through valve 31 to condenser 32 from which it may be passed to receiving tank 33 and ultimately returned to the pot 40 of the column 22 by the pump 34. This overhead ammonia fraction contains a small proportion of tri-methyl amine, and this tri-methyl amine is thus returned to the column 22 with the recycled ammonia, thereby avoiding loss of tri-methyl amine. By continued operation of these elements of the distillation and extraction equipment, all of the tri-methyl amine is ultimately dissolved in the xylene.

The solution of tri-methyl amine in xylene obtained by the scrubbing operation in the column 28 is passed from the base of that column through valve 35 to a column 36, where the tri-methyl amine is separated from the xylene by distillation, the xylene being passed as a condensate through cooler 37 and valve 38 to the xylene storage tank 29, while the tri-methyl amine is passed overhead through valve 39 and condenser 40' to the crude tri-methyl amine receiving tank 41. The tri-methyl amine fraction passed to the receiver 41 will contain a small proportion of ammonia, and it is preferably redistilled to provide an overhead fraction consisting of an azeotropic mixture of ammonia and tri-methyl amine, with substantially pure tri-methyl amine as the distillation residue.

Best results in operation of the process of Figure 2 have been attained in cases in which the column 22 was operated as a continuous distillation column under a gauge pressure of 250 lbs. per square inch, and the column 28 operated as a continuous scrubbing column under a guage pressure of 200 lbs. per square inch, the column 36 being operated at a gauge pressure of 50 lbs. per square inch. The pressure in the column 28 may be regulated by adjustment of the valve 31 and the pressure in the column 36 by adjustment of the valve 39. The liquid levels in the columns 28 and 36 may be maintained substantially constant during the continuous extracting and distillation operation by the valves 35 and 38, respectively.

After removal of the tri-methyl amine and ammonia in the manner described above, the mono- and di-methyl amines and ammonia remaining in the pot 40 may be separated from each other by distillation.

The problems involved in separation of crude amine reaction mixtures into their constituents when higher amines are formed by amination of alcohols or ethers are somewhat different, and usually somewhat simpler, than those involved in rectification of reaction mixtures formed in amination of methanol or methyl ether. In the case of these higher amines, one of the principal problems involves separation of the nitriles from the amines, an operation which is difficult to accomplish by distillation in the case of some amines.

In the treatment of these mixtures, it has been found that the preliminary treatment with an aqueous basic solution will solve the problem, just as in the case of the methyl amines. In this case also, the treatment may be accomplished with a solution of aqueous sodium hydroxide or other base (preferably inorganic) by batch operation, or continuously. The fractionating system by which this treatment and subsequent distillation are accomplished may be, in general, similar to that illustrated on Figure 1 of the flow sheet as applied in treatment of crude methyl amines. Thus, the crude amine reaction mixture may first be contacted with an aqueous basic solution and the aqueous phase, containing in solution the product of reaction of the base with the nitrile, may then be separated from the remainder of the reaction mixture by distillation. In this case as in the treatment of the methyl amines, the more volatile constituents may be distilled from the aqueous solution of non-volatile reaction products in such a manner as to collect constituents of successively higher boiling compounds separately, or the more volatile reaction products may be distilled overhead from the aqueous solution and collected together, and a separate fractionation of the reaction constituents from each other thereafter accomplished. In the treatment of the higher amine reaction mixtures, it is believed that the basic solution first effects hydrolysis of the nitrile with liberation of ammonia, followed by reaction of the base with the acid formed by the hydrolysis to produce the corresponding organic acid salt.

In the treatment of the higher amines to remove nitriles and other undesired constituents, as in the treatment of methyl amine reaction mixtures, the concentration of the alkaline solution, as well as other conditions, may vary within rather wide limits. In cases in which sodium hydroxide solutions were employed, solutions of approximately 10% concentration have given excellent results.

Example I 2100 grams of crude reaction product resulting from vapor phase catalytic amination of methanol by ammonia were placed in an autoclave with 800 grams of a 50% aqueous sodium hydroxide solution. The mixture was stirred and heated at 120° C. for two hours under about 375 lbs. per square inch gauge pressure. Upon cooling and fractionating the mixture at atmospheric pressure separation of the methyl amines was obtained with no evidence of carbamates or formaldehyde compounds in the finished product.

Example II

A crude reaction product of vapor phase catalytic amination of methanol was run into the scrubbing column 9 continuously at a temperature of 112° C. An aqueous sodium hydroxide solution of 27% concentration was pumped into the column at 85° C. as illustrated in Figure 1 of the flow sheet. The bottom temperature of this scrubbing unit was maintained at 171° C. and the purified reaction products, free from carbamates and formaldehyde-amine compounds left the top of the tower at 83° C. This overhead fraction was then distilled as discussed in the description of the operation of the column 16 above, and a residue containing mono- and di-methyl amine in admixture with ammonia was obtained. This residue was thereafter subjected to a separate distillation step to separate the mono- and di- methyl amines from each other and from the ammonia.

Example III

A crude amine reaction mixture resulting from amination of methanol was subjected to caustic scrubbing and preliminary distillation as described in connection with Figure 1 of the drawings, the column 9 being maintained under pressure of 225 lbs. per square inch, and an aqueous caustic soda solution of between 10 and 12% concentration being employed in the scrubbing operation. During this operation the crude reaction product entered the scrubber 9 at a temperature of about 165° C. and the temperature at the top of this scrubber was approximately 90° C. After distillation of the overhead fraction from the scrubber 9 in the still 16, 323 lbs. of crude methyl amine mixture, containing mono-, di-, and tri-methyl amine, together with ammonia, were collected in the still pot 21. This material was fed, together with 122 lbs. of ammonia, to the column 22, and tri-methyl amine was distilled overhead from this column, together with ammonia, as in azeotropic mixture. A good reflux was maintained in column 22 by proper adjustment of the heat to the pot 40 and the cooling water used to cool the gases passed through condenser 23. The mixture of ammonia and tri-methyl amine was passed through vaporizer 26 to scrubber 28, which was maintained at about 225° C. Xylene was continuously fed to the top of the scrubbing column 28 as illustrated in Figure 2 of the flow sheet. Operation was continuously conducted under these conditions, with removal of ammonia overhead through condenser 32, until the concentration of the tri-methyl amine in the distillate from the column 22 dropped to 5%. When this condition was reached, valves 7 and 16 were closed, and the remaining material in the column 22 was fractionally distilled. The following cuts were obtained as the result of this distillation:

| Cut No. | Wt., pounds | Material |
| --- | --- | --- |
| 1 | 90.5 | $NH_3$ containing 6% $(CH_3)_3N$. |
| 2 | 26.5 | $NH_3$ and $CH_3NH_2$. |
| 3 | 34 | $CH_3NH_2$ (98% pure). |
| 4 | 45.5 | $CH_3NH_2$ and $(CH_3)_2NH$. |
| 5 | 89.5 | $(CH_3)_2NH$ (99+% pure). |

During the scrubbing operation performed in the scrubbing column 28, the solution of trimethyl amine in xylene removed from the base of this column was passed continuously to column 34, where it was distilled to separate the trimethyl amine from the xylene. The overhead fraction of this distillation, consisting of 154 lbs. of product analyzing about 4% ammonia and 96% tri-methyl amine was collected in receiver 12.

Example IV

A crude reaction product formed by the amination of ether over a silica on alumina catalyst at 370° C. is run into the scrubbing column 9 at a temperature of about 100° C. An aqueous sodium hydroxide solution of 10% concentration is run into the column at a temperature of 125° C. as illustrated in Figure 1 of the flow sheet. A pressure of approximately 75 pounds per square inch is maintained on the system during the scrubbing operation so that the liquid leaving the bottom of the scrubber contains essentially water, sodium carbonate and sodium acetate while the volatile organic substances together with ammonia pass overhead. Upon fractionation of the distillate sharp separations may be achieved with the production of a diethylamine of high titer and excellent purity.

Various modifications are possible within the scope of the invention, and I do not therefore wish to be limited except by the scope of the following claims.

I claim:

1. In the purification of amine-containing reaction mixtures resulting from animantion of aliphatic alcohols and ethers, the process comprising mixing the crude reaction mixture as obtained from the amination reaction and containing the amine bases resulting from the amination reaction with an aqueous solution of an inorganic base and thereafter separating amines contained in said reaction mixture by distillation from the aqueous solution resulting from said mixing operation.

2. In the purification of amine-containing reaction mixtures resulting from amination of aliphatic alcohols and ethers, the process comprising mixing the crude reaction mixture as obtained from the amination reaction and containing the amine bases resulting from the amination reaction with an aqueous solution of an alkali metal hydroxide and thereafter separating amines contained in said reaction mixture by distillation from the equeous solution resulting from said mixing operation.

3. In the purification of amine-containing reaction mixtures resulting from amination of aliphatic alcohols and ethers, the process comprising mixing the crude reaction mixture as obtained from the amination reaction and containing the amine bases resulting from the amination reaction with an aqueous solution of an inorganic base, thereafter separating by distillation constituents of the mixture resulting from said treatment with said inorganic base which are more volatile than said aqueous solution from the resulting aqueous solution, and finally subjecting the mixture so separated from said aqueous solution to distillation to separate the constituents thereof from each other.

4. In the purification of amine-containing reaction mixtures resulting from amination of aliphatic alcohols and ethers, the process comprising mixing the crude reaction mixture as obtained from the amination reaction and containing the amine bases resulting from the amination reaction with an aqueous solution of an inorganic base, thereafter separating amines contained in said reaction mixture by distillation from the aqueous solution resulting from said mixing operation, and finally separating from each other by distillation the amines of the mixture separated by distillation from said aqueous solution.

5. In the purification of amine-containing reaction mixtures resulting from amination of aliphatic alcohols and ethers, the process comprising passing the crude reaction mixture as obtained from the amination reaction and containing the amine bases resulting from the amination reaction into a distillation column, passing an aqueous solution of an inorganic base in counter-current relationship to said crude reaction mixture through said column, collecting the resulting aqueous solution at the base of the column while passing the residual amine-containing mixture in vapor phase upwardly through said column to effect separation of said amine-containing mixture from the resulting aqueous solution, and finally separating the constituents of said overhead amine-containing distillate from each other by a subsequent distillation operation.

6. In the purification of amine-containing reaction mixtures resulting from amination of a compound chosen from the class of methanol and methyl ether, the process comprising mixing the crude reaction mixture as obtained from the amination reaction and containing the amine bases resulting from the amination reaction with an aqueous solution of an inorganic base and thereafter separating amines contained in said reaction mixture from the aqueous solution resulting from said mixing operation by passing said amines overhead in vapor phase.

7. In the purification of amine-containing reaction mixtures resulting from amination of a compound chosen from the class consisting of methanol and methyl ether, the process comprising mixing the crude reaction mixture as obtained from the amination reaction and containing the amine bases resulting from the amination reaction with an aqueous solution of an alkali metal hydroxide and thereafter separating amines contained in said reaction mixture by distillation from the aqueous solution resulting from said mixing operation.

8. In the purification of amine-containing reaction mixtures resulting from amination of a compound chosen from the class consisting of methanol and methyl ether, the process comprising mixing the crude reaction mixture as obtained from the amination reaction and containing the amine bases resulting from the amination reaction with an aqueous solution of an inorganic base, thereafter separating by distillation constituents of the mixture resulting from said treatment with said inorganic base which are more volatile than said aqueous solution from the resulting aqueous solution of said inorganic base, and finally subjecting the mixture so separated from said aqueous solution to distillation to separate the constituents thereof from each other.

9. In the purification of amine-containing reaction mixtures resulting from amination of a compound chosen from the class consisting of methanol and methyl ether, the process comprising passing the crude reaction mixture as obtained from the amination reaction and containing the amine bases resulting from the amination reaction into a distillation column, passing an aqueous solution of an inorganic base in counter-current relationship to said crude reaction mixture through said column and collecting the resulting aqueous solution at the base of the column while passing the residual amine-containing mixture in vapor phase upwardly through said column to effect separation of said amine-containing mixture from the resulting aqueous solution.

10. In the purification of amine-containing reaction mixtures resulting from amination of aliphatic alcohols and ethers containing at least two carbon atoms in a single aliphatic radical, the process comprising mixing the crude reaction mixture as obtained from the amination reaction and containing the amine bases resulting from the amination reaction with an aqueous solution of an inorganic base and thereafter separating amines contained in said reaction mixture by distillation from the aqueous solution resulting from said mixing operation.

JOHN F. OLIN.